United States Patent [19]
Logue et al.

[11] 3,744,281
[45] July 10, 1973

[54] CAR KEY HOLDER
[76] Inventors: Russell F. Logue; William Kolath, 2244 S. Kingshighway, both of 2244 S. Kingshighway, Mo. 63110
[22] Filed: Nov. 26, 1971
[21] Appl. No.: 202,216

[52] U.S. Cl............................. 70/58, 70/63, 109/50, 109/57
[51] Int. Cl....................... E05b 69/00, E05b 73/00
[58] Field of Search .................... 109/23, 50, 51, 45; 224/42.37, 42.38, 42.39, 42.43; 70/58, 63

[56] References Cited
UNITED STATES PATENTS
2,273,580   2/1942   Kruschwitz et al. .................... 70/63
2,010,877   8/1935   Morell ................................... 109/51
1,356,742   10/1920  Scarlett................................. 109/50

Primary Examiner—David J. Williamowsky
Assistant Examiner—Conrad L. Berman
Attorney—Raymond R. Kimpel

[57] ABSTRACT

A car key holder comprising a receptacle with a closure adapted to receive an ignition key for a car. The holder can be attached to the exterior of a car on a door window. Access to the ignition key and the receptacle is gained by use of a second key.

1 Claim, 3 Drawing Figures

PATENTED JUL 10 1973  3,744,281

RUSSELL F. LOGUE
WILLIAM KOLATH
INVENTORS

BY
Raymond R. Kimpel
ATTORNEY

CAR KEY HOLDER

This invention relates to new and useful improvements in Car Key Holders, and more particularly, relates to a Car Key Holder adapted to be attached to the exterior of a car in such a manner as to make the key to that car readily accessible to a car salesman.

In the operation of car sales lots of substantial size, it is a common practice to use a key board where the keys to the various cars displayed for sale are kept available to all the salesmen. When a prospective customer desires to see a car on the lot, a salesman gets the key from the key board and shows the car. After showing the car, the key is then returned to the key board where it is again available to other salesmen. In the constant taking and returning of the keys, it is difficult and time consuming to keep the proper keys in the proper place without incurring delay and confusion. A need exists for maintaining the keys close to the particular cars which they belong to while still maintaining adequate security so the cars cannot be removed by unauthorized persons.

Accordingly, it is an object of this invention to provide such a car key holder which can be easily attached and removed from a car without requiring special tools or equipment.

It is a further object of this invention to provide a car key holder which can be attached to any make or model of car having roll-up windows.

It is a further object of this invention to provide a car key holder which can be applied to a car having curved windows, as well as those having flat glass windows.

Other circuits and advantages of this invention will become apparent upon inspection of the accompanying drawings in which.

Figure 1:
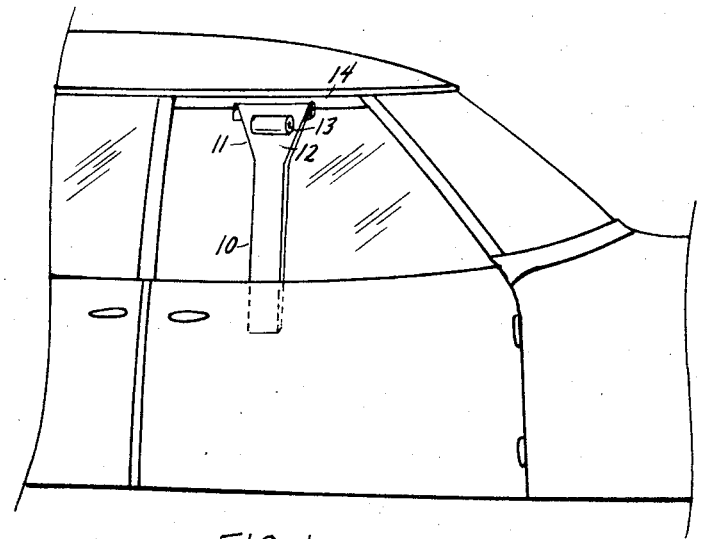
FIG. 1 is a general view showing the car key holder affixed in place on a typical car.
Figure 2:
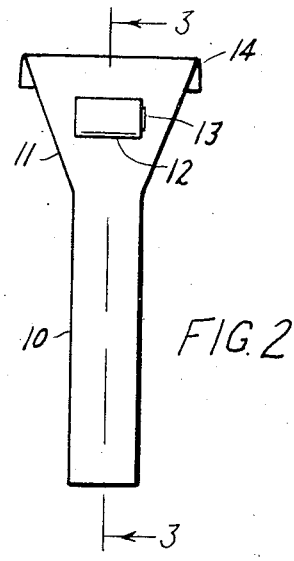
FIG. 2 is a front elevation view of the car key holder.
Figure 3:
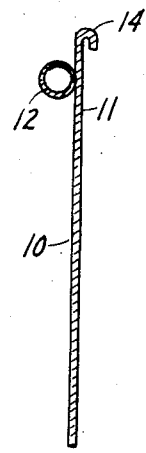
FIG. 3 is a cross-section view on line 3—3 of FIG. 2.

Referring now more particularly to the drawings, in FIG. 1 the car key holder is shown as comprising a flat flexible lower member 10 and a flared upper portion 11 terminating in a retaining curve 14. A hollow cylinder 12 is securely fastened to the upper portion 11. A cylinder lock 13 is adapted to fit into the open end of cylinder 12 to provide a receptacle therein to receive a key.

The flat lower member 10 extends downward between the window glass and the car door on the exterior of the car. After the flat lower member has been inserted between the window and the door, the retaining curve 14 is placed over the top edge of the window glass, and the window rolled upward as far as it will travel. The car is then locked with the key and the key is placed in the cylinder receptacle 12. This cylinder lock 13 is adapted to receive a common key which fits all the car key holders on the sales lot and a similar common key is in the possession of all persons authorized to enter the cars on the lot. Thus each car has affixed to it a key to that particular car which is readily available and accessible only to the authorized salesmen possessing a common key with which to enter the car key holder. It thus becomes unnecessary to maintain a central key board for the cars and the delay and confusion in securing the proper key to show a car is avoided resulting in great savings of time. Also the confusion resulting from the salesmen neglecting to promptly return keys to the key board is avoided.

Although a particular modification of this invention has been shown in the drawings and described in the specification, it is to be understood that various changes and modifications could be made in the invention without departing from the spirit of the invention and the scope of the appended claims, and all such changes and modifications are intended to be included in the following claims:

I claim:

1. A car key holder comprising a flat flexible lower member which is of sufficient length to extend from the top of a usual car window opening to a point below said car window opening, a flared upper portion attached to said lower member and having a retaining curve with an inside diameter approximately equal to the thickness of the usual car window glass, and adapted to fit over the top edge of a car window and be received in the upper opening of a car door which receives a car window in the rolled-up position, a cylindrical receptable with closure means fixed permanently to said upper portion, said car key holder adapted to be removably attached to a car window and door with said retaining curve engaging the upper edge of said window and said flat flexible lower member extending downwardly between the car window glass and the car door structure.

* * * * *